US008897923B2

(12) United States Patent
Haynes

(10) Patent No.: US 8,897,923 B2
(45) Date of Patent: Nov. 25, 2014

(54) ACHIEVING ENERGY DEMAND RESPONSE USING PRICE SIGNALS AND A LOAD CONTROL TRANSPONDER

(75) Inventor: David Haynes, O'Fallon, MO (US)

(73) Assignee: Aclara Technologies LLC, St. Louis, MO (US)

( * ) Notice: Subject to any disclaimer, the term of this patent is extended or adjusted under 35 U.S.C. 154(b) by 1060 days.

(21) Appl. No.: 12/809,134

(22) PCT Filed: Dec. 10, 2008

(86) PCT No.: PCT/US2008/086183
§ 371 (c)(1),
(2), (4) Date: Jan. 11, 2012

(87) PCT Pub. No.: WO2009/085610
PCT Pub. Date: Jul. 9, 2009

(65) Prior Publication Data
US 2012/0101651 A1   Apr. 26, 2012

Related U.S. Application Data

(60) Provisional application No. 61/015,049, filed on Dec. 19, 2007.

(51) Int. Cl.
G05D 17/00 (2006.01)
H02J 3/14 (2006.01)
G06Q 10/00 (2012.01)
G06Q 20/00 (2012.01)

(52) U.S. Cl.
CPC ............. *H02J 3/14* (2013.01); *H02J 2003/146* (2013.01); *Y02B 70/3225* (2013.01); *Y04S 20/222* (2013.01); *Y04S 20/224* (2013.01)
USPC ............ 700/295; 705/7.31; 705/7.35; 705/20

(58) Field of Classification Search
USPC ........................ 700/295; 705/7.35, 7.31, 20
See application file for complete search history.

(56) References Cited

U.S. PATENT DOCUMENTS 4,034,839 A * 7/1977 Lee ................................ 194/218
4,130,874 A * 12/1978 Pai ................................ 709/245
(Continued)

OTHER PUBLICATIONS

Notification of Transmittal of the International Search Report and the Written Opinion Application No. PCT/US2008/086183 filed Dec. 10, 2008, 31 pages.
(Continued)

Primary Examiner — Kavita Padmanabhan
Assistant Examiner — Thomas Stevens
(74) Attorney, Agent, or Firm — Polster, Lieder, Woodruff & Lucchesi, L.C.

(57) ABSTRACT

A method of Demand Response (DR) utilizing a Load Control Transponder (LCT) installed at the location of an electricity consumer. A DR program, in conjunction with the LCT, allows a consumer to determine, in advance, when they will reduce their demand on an electricity supply system. The consumer is informed of price points at which the cost of energy increases due to overall demand. The consumer then determines if, and when, they will reduce their demand on the system when a price point is reached. In addition, when an unplanned, critical event occurs, the method enables the utility to bypass any intermediate consumer established settings and immediately and directly drop the level of energy consumption to the consumer's lowest selected level for continuing service thereby to shed sufficient load on the system to maintain an adequate level of electricity supply. Once the event has been resolved, the method enables the utility to restore the consumer's previous level of usage.

12 Claims, 2 Drawing Sheets

(56) References Cited

U.S. PATENT DOCUMENTS

| | | | |
|---|---|---|---|
| 4,135,101 A * | 1/1979 | Young et al. | 307/39 |
| 4,135,181 A * | 1/1979 | Bogacki et al. | 340/870.03 |
| 4,161,720 A * | 7/1979 | Bogacki | 340/870.03 |
| 4,317,175 A * | 2/1982 | Sterling et al. | 705/412 |
| 4,324,987 A * | 4/1982 | Sullivan et al. | 307/35 |
| 4,341,345 A * | 7/1982 | Hammer et al. | 236/46 R |
| 4,551,812 A * | 11/1985 | Gurr et al. | 700/295 |
| 4,771,185 A * | 9/1988 | Feron et al. | 307/39 |
| 5,274,571 A * | 12/1993 | Hesse et al. | 700/291 |
| 5,283,572 A | 2/1994 | Mcclelland | |
| 5,572,438 A * | 11/1996 | Ehlers et al. | 700/295 |
| 5,644,173 A * | 7/1997 | Elliason et al. | 307/34 |
| 5,924,486 A * | 7/1999 | Ehlers et al. | 165/238 |
| 5,926,776 A * | 7/1999 | Glorioso et al. | 702/130 |
| 6,185,483 B1 * | 2/2001 | Drees | 700/295 |
| 6,732,019 B2 * | 5/2004 | Spool et al. | 700/291 |
| 6,965,319 B1 | 11/2005 | Crichlow | |
| 7,788,051 B2 | 8/2010 | Patel | |
| 8,010,240 B2 | 8/2011 | Mattiocco | |
| 8,467,885 B2 * | 6/2013 | Josephson et al. | 700/11 |
| 2002/0019758 A1 * | 2/2002 | Scarpelli | 705/7 |
| 2002/0103655 A1 * | 8/2002 | Boies et al. | 705/1 |
| 2003/0041037 A1 * | 2/2003 | Spool et al. | 705/80 |
| 2004/0174071 A1 * | 9/2004 | Nierlich et al. | 307/11 |
| 2004/0220869 A1 * | 11/2004 | Perera | 705/37 |
| 2004/0254654 A1 | 12/2004 | Donnelly et al. | |
| 2005/0060107 A1 * | 3/2005 | Rodenberg et al. | 702/62 |
| 2005/0102068 A1 * | 5/2005 | Pimputkar et al. | 700/291 |
| 2005/0116814 A1 * | 6/2005 | Rodgers et al. | 340/310.01 |
| 2006/0142900 A1 * | 6/2006 | Rothman et al. | 700/295 |
| 2006/0259199 A1 * | 11/2006 | Gjerde et al. | 700/284 |
| 2007/0103334 A1 | 5/2007 | Soni | |
| 2008/0281663 A1 * | 11/2008 | Hakim et al. | 705/8 |
| 2010/0076835 A1 | 3/2010 | Silverman | |
| 2010/0156664 A1 * | 6/2010 | Swarztrauber et al. | 340/870.02 |
| 2013/0162038 A1 * | 6/2013 | Falk et al. | 307/26 |

OTHER PUBLICATIONS

International Preliminary Search Report, PCT/US2008/086183, 3 pages.

* cited by examiner

US 8,897,923 B2

ACHIEVING ENERGY DEMAND RESPONSE USING PRICE SIGNALS AND A LOAD CONTROL TRANSPONDER

CROSS-REFERENCE TO RELATED APPLICATIONS

The present application is the US national stage under 35 U.S.C. §371 of International Application No. PCT/US2008/086183 filed on Dec. 10, 2008, which is related to and claims priority from U.S. Provisional Patent Application Ser. No. 61/015,049 filed on Dec. 19, 2007, which is herein incorporated by reference.

STATEMENT REGARDING FEDERALLY SPONSORED RESEARCH

Not Applicable.

BACKGROUND OF THE INVENTION

This invention relates to the consumption of energy generated or supplied by a utility; and more particularly, to controlling the amount of consumption in response to increased load demands on the utility at peak times of usage, as well as in response to occurrences at the utility affecting its ability to supply energy.

Electrical energy is a form of energy that can be traded as a commodity, but cannot be stored. Rather, it must be generated as it is used. The traditional approach used by electrical utilities to manage energy is referred to as "reliability based". Using this approach, the utility brings additional generation capability on-line, in order to meet increased loads placed on the utility's power distribution system. Under this process, the system's operator must be careful to match the amount of electricity generated to the amount of load on the system. When, however, a crisis develops and the load threatens to exceed the supply, the utility will attempt to take action in order to maintain a stable system. At such times, account representatives at the utility may call upon certain, large electricity consumers (customers) and ask them if they would temporarily go off-line. If, however, the utility owns a load-control system (such as the TWACS® Load Control system), the utility can directly issue load-shed commands to thousands (or even millions) of electricity consuming devices located throughout the distribution network, and get them to go partially (or completely) off-line. This approach works solely on the basis of system reliability, without much concern for the supply-side economics that accompany the crisis situation.

A newer approach to managing energy in some areas is "price-based". This approach allows market forces to affect the price of electricity, and allows the consumer to buy (or not buy) electricity in response to changes in its price. When a power generation shortfalls occur, the scarcity of the commodity makes it more valuable, and the price for electricity, in a free-market economy, should rise. Conversely, when a surplus of electrical generation occurs, the price of electricity should fall. A free market economy automatically allows generators with low operating costs to obtain the lion's-share of the sale of electricity, with the consumer benefiting from its lower price. As the price rises, however, generators with more expensive operating costs are able to profitably contribute to the grid, and stability is maintained. Real Time Pricing (RTP), in all of its many forms, requires constant communication among all of the stakeholders. In a "pure", de-regulated RTP environment, the wholesale price of electricity rises and falls on the spot-market as a function of supply; and, depending on whatever contracts are in place, will likely be immediately reflected in the retail-price of energy. These retail prices can be communicated to consumers using a communication system such as TWACS®. Prices might be rendered in terms of cents per kWh (or dollars per MWh); but, alternatively, can be rendered in terms of a tiered pricing scheme. As set out hereinafter, such a scheme might use names such as "normal", "elevated", "Critical Peak 1", "Critical Peak 2"; or a color code scheme such as "green", "yellow", "orange", "red". Regardless of the labels used, all such schemes require communication with the consumers and/or their equipment in near real-time.

Many utilities currently employ a two-way automatic communication system such as TWACS® by which the utility sends messages to, and acquires information from, its customers. Communications with TWACS® provides the utility with "fresh" load information on the system. Historical usage information can be used to create distribution system models, with recent, fresh information used to verify the accuracy of the models. The models are then used to predict when peak demands on the system can be expected to occur for different times of the year, as well as for various sets of circumstances such as temperature and time of day.

However, in addition to the demands placed upon a distribution system during the normal course of events and which a utility can to some degree predict, other circumstances may occur which are not planned, yet which have an immediate impact on the supply of electricity to consumers. A generator 10 (see FIGS. 1 and 3) might suddenly drop off-line, a ground-fault may occur, an unexpected load will draw substantial amounts of power. Any of these can escalate to a point where the system becomes unstable. When such an occurrence happens, it can be readily ascertained in a number of ways. For example, one measure of the severity of the problems is that when too much load is placed on the system, generators start to run marginally slower. This is evidenced by a drop in the frequency of the electricity generated. In such instances, things can start to quickly unravel. While new communication technology can enable price-based, demand response programs such as described above to work in these situations, there still exists a need for an autonomous, emergency over-ride capability.

BRIEF SUMMARY OF THE INVENTION

The present disclosure is directed to a method of Demand Response (DR) utilizing a Load Control Transponder (LCT) or other devices installed at the location of an electricity consumer. The DR method, in conjunction with the LCT, first allows a consumer to determine, in advance, when they will reduce their energy consumption in response to increases in the price of electricity due to increases in overall demand. The consumer is allowed to define what action they wish to be taken with their equipment (appliances A in FIG. 1) when a given price point is reached.

In an environment where "step prices" are predefined by a given utility, the consumer will be provided hardware with preprogrammed preferences. The consumers are then allowed to change these preferences, so to limit their level of usage for each of the price points. This includes maintaining their current level of usage, reducing the level of usage, or shutting items off altogether. Consumer preferences may also be affected by such factors as the time of day, or the day of the week. For example, a consumer may be perfectly willing to curtail usage of an appliance altogether during those hours of the day they are not at home, or severely reduce or shutoff a device on a Saturday or Sunday. In the situation where RTP is communicated, the complexity of the task usually increases. The present invention functions to simplify the task by allowing equipment to enforce a "price cap" on behalf of the consumer; thereby controlling electricity usage and enabling the consumer to think strategically in terms of price and comfort levels.

In accordance with the invention, various types of equipment can be used (in conjunction with TWACS® or otherwise) to compute "usage levels" based on settings configured for various price or "switch" points. The switch points contain factory defaults which may be adjusted by the user to identify a "price cap" to be enforced at various levels of the parameter (s) under control. These parameters include temperature, flow, fuel supply levels, etc. Once customer preferences have been established in the equipment, all of the parameters necessary for the calculation of a duty cycle (percent of the time the equipment or appliance is "on") for a given event may be broadcast to the devices in the field—the price of electricity (both current pricing and forecasted), the expected duration of a critical event and/or price, the current date, and the current time of day may all be broadcast using TWACS© or some other means of mass communication such as the Internet. To predict the effect of a given broadcast (and to audit the results), consumer preferences, consumer over-ride information, and other maintenance data may be collected using TWACS© or some other means of two-way communication.

Finally, when an unplanned, critical event occurs resulting in, for example, an under-frequency condition, the method enables the end device to "self-declare" an emergency, and to immediately and directly bypass any intermediate consumer established settings and drop the level of energy consumption to the consumer's lowest selected level of usage, thereby shedding sufficient load on the system to maintain stability and an adequate supply of electricity. Once the event has been resolved, the method further enables the utility to restore the consumer's previous level of usage.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

Corresponding reference characters indicate corresponding parts in the views of the drawings.

DESCRIPTION OF THE PREFERRED EMBODIMENT

Figure 1:
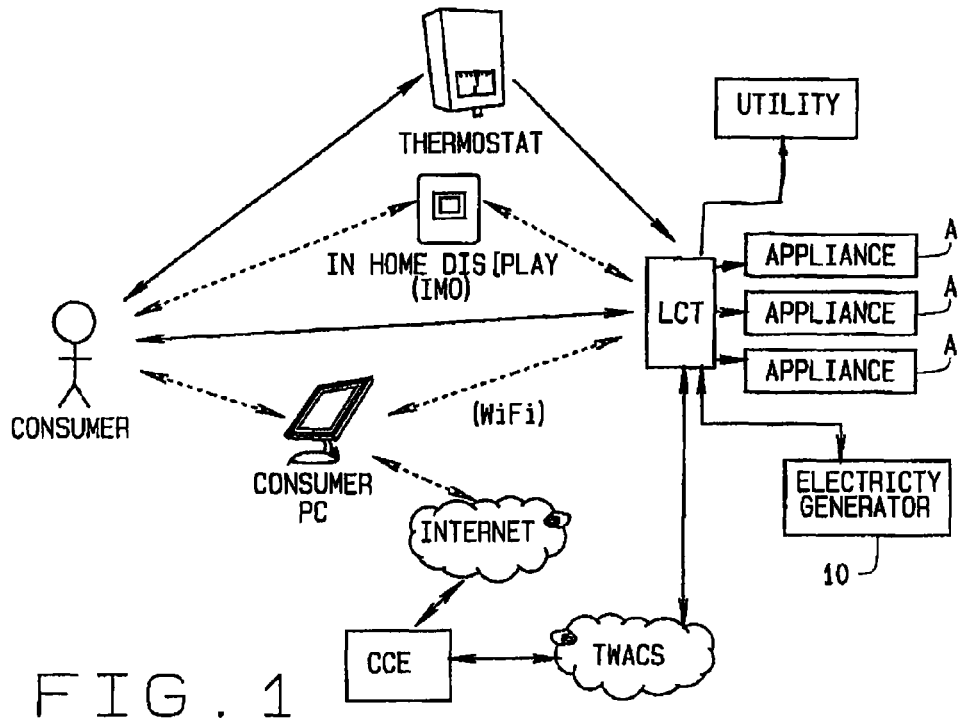
FIG. 1 is a simplified representation of the demand response method of the invention by which a consumer or utility can affect the level of energy consumption at a premises; and, FIG. 2 is a simplified representation of a control panel for a LCT by which the consumer can select levels of electrical usage for different load demands on the utility system.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Direct load control involves a command signal sent by a utility, via TWACS® or other means of communication, to equipment that controls a dispatchable load; i.e., a load whose energy usage either can be reduced to some fraction of its full duty cycle usage or shut-off altogether. When the equipment receives the command, it shuts down or significantly reduces its duty cycle so the load it places on the utility is correspondingly reduced or shed. Depending upon circumstances, a load control regimen may involve temporarily shutting down a piece of equipment for a given time period and then bringing that piece of equipment back on-line, while shutting down another piece of equipment. By rotating this shedding of load among a group of consumers over a given period of time, no consumer is unduly inconvenienced. Involvement in a load control program is usually voluntary. To foster participation, participants are supplied electricity at a discount, and the program employs some type of reliability criteria to initiate load shedding.

Demand response, among other activities, involves communicating cost/pricing information to consumers of electricity so they can determine their individual levels of usage at different times and under different conditions. Viewed from a market standpoint, electricity is a commodity subject to supply and demand; i.e., as demand increases so does price, and vice versa. An important aspect of this market is communicating the price of electricity for different load demand conditions to consumers so they can decide how to operate their equipment or appliances during the different times and conditions. The consumer's choices can include full usage at certain times, partial usage (load shedding) at other times, and no usage at all (complete shut off) during times of peak power demand. Each choice is reflective of the price of electricity at those times.

Unlike a load control program, participation in a demand response program is often mandatory. But, in such programs, the consumer has the capability of choosing not to participate in non-critical events. However, if a critical event occurs (a generator goes off-line, a ground fault suddenly occurs, etc.) which threatens the utility's ability to supply electricity, the utility can declare a critical event, cut back on the load placed on the supply system by each consumer, with the consumer not having the ability (option) of overriding the utility's actions. Rather, the reverse occurs, with the utility being able to override any constraints placed by the consumer on their energy consumption.

In a demand response program, price information is communicated to the consumer, again using TWACS® or other means of communication, and the consumer has the ability, using an LCT for example, of determining at what price points they want their appliances and equipment to start consuming less power. Referring to Table 1, a schedule for a demand response program may appear as follows:

TABLE 1

| Critical Peak Price (CPP) | Electricity Rate | Severity | Consumer over-ride option | LCT Closed Time |
|---|---|---|---|---|
| Green | Standard | Normal | N/A | 100% |
| Yellow | Std + 10% | Stage 1 | Enabled | 90% |
| Orange | Std + 30% | Stage 2 | Enabled | 70% |
| Red | Std + 80% | Stage 3 | Disabled | 0% |

The CPP levels, rates, severities, and customer over-ride capability, are generally defined at the onset of the program, and are reviewed on a periodic basis; e.g., annually. The LCT closed time (a.k.a. duty cycle), in accordance with this invention, is a computed value (as a function of customer preferences and other parameters).

The table indicates that under normal (Green) operating conditions, the standard electricity rate is applied, and that the appliances or equipment are operating at their normal rate; i.e., 100% of the time if they are on. However, as operating conditions change from normal, going through Yellow to Orange to Red, this reflects increasing load demand on the utility. As each new level is reached, the price of electricity increases from standard by some multiplier (10% increase, 30% increase, 80% increase) and the consumer has the option of reducing the duty cycle or "on" time of their appliances or equipment accordingly. That is, the consumer can enable a LCT or other device to reduce the duty cycle by some preset amount; so, as shown in the table, it is reduced as the severity of the situation changes from normal to stage 1 or stage 2. At peak conditions, at which the price of electricity is at a peak, the consumer can choose to disable the equipment altogether.

As shown by the table, this protocol enables utilities to control load demand during peak periods by establishing a range of consumer prices that increases as load demand increases. The consumer is told that if they want to use equipment during a low demand period, the cost to the consumer will be proportionately less than if they want to use the equipment during times of peak demand. Based upon the range of prices, the consumer can tell the utility that they either want the appliance left on as demand increases, or that when the demand reaches a pre-established price point, they want the equipment shut-down (or its usage cut back to a predetermined lower level), with an appropriate reduction in cost for less usage of the equipment.

TABLE 2

| Real Time Price (RTP) | Severity | Consumer over-ride option | LCT Closed Time |
|---|---|---|---|
| 4¢ | Normal | N/A | 100% |
| 7¢ | Normal | Enabled | 90% |
| 14¢ | Normal | Enabled | 70% |
| 21¢ | Critical | Disabled | 0% |

It will be appreciated that implementing a price/usage/load demand strategy as outlined above involves certain issues that must be resolved. For example, can a utility effectively control operation of consumer appliances such as air conditioners and the like, and commercial equipment, remotely? Are currently available devices such as a programmable thermostat sufficient to achieve the necessary level of control, or must these devices be supplemented as, for example, connecting a LCT in series with the appliances or equipment? Can a utility take into account differences in life styles (normal v. elderly v. infirm v. housebound, etc.) of residential customers within the same cluster of users? In this same regard, will the control scheme employed by the utility be sufficiently adaptable that a customer's change in needs, after a system is implemented, can be readily accommodated? How will pricing changes which occur after the system is operational be implemented?

Referring to FIG. 1, a LCT is controllable by the utility to enforce price restraints in the consumption of electricity. For this purpose, the LCT is installed at a consumer's premises to control operation of, for example, the home's air conditioning system. As shown in the Fig., the LCT is connected in series with the system. The LCT is programmable both by the utility and the consumer with consumer preferences regarding the range of prices of electricity and the customer's comfort level at each of these prices. Programming can be done directly by the consumer, through thermostat settings, a personal computer (PC), or an in-home display (IHD) device. Programming is done by the utility using TWACS®, or via the internet using the customer's PC. Regardless, once the system is up and running and the customer's desires have been programmed, the LCT executes cost-versus-time programs to maintain the set price/comfort levels.

Figure 2:
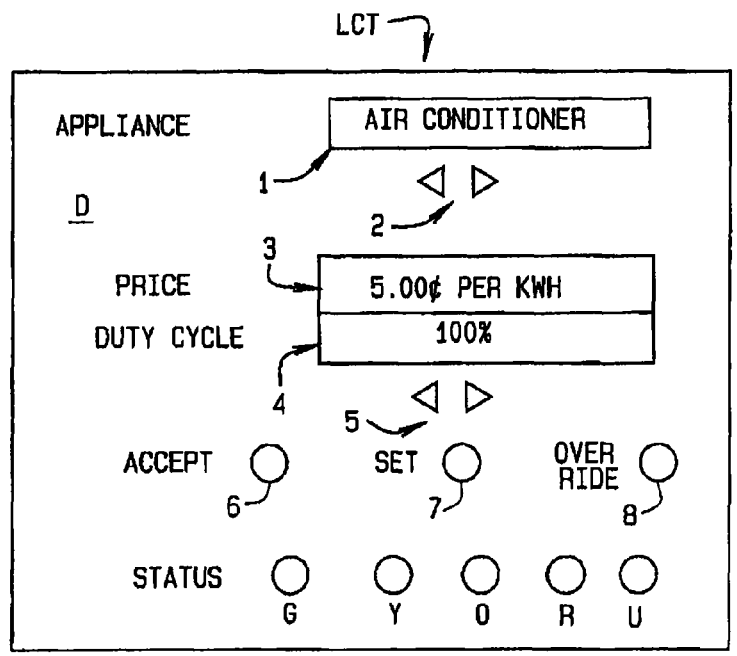
Figure 3:
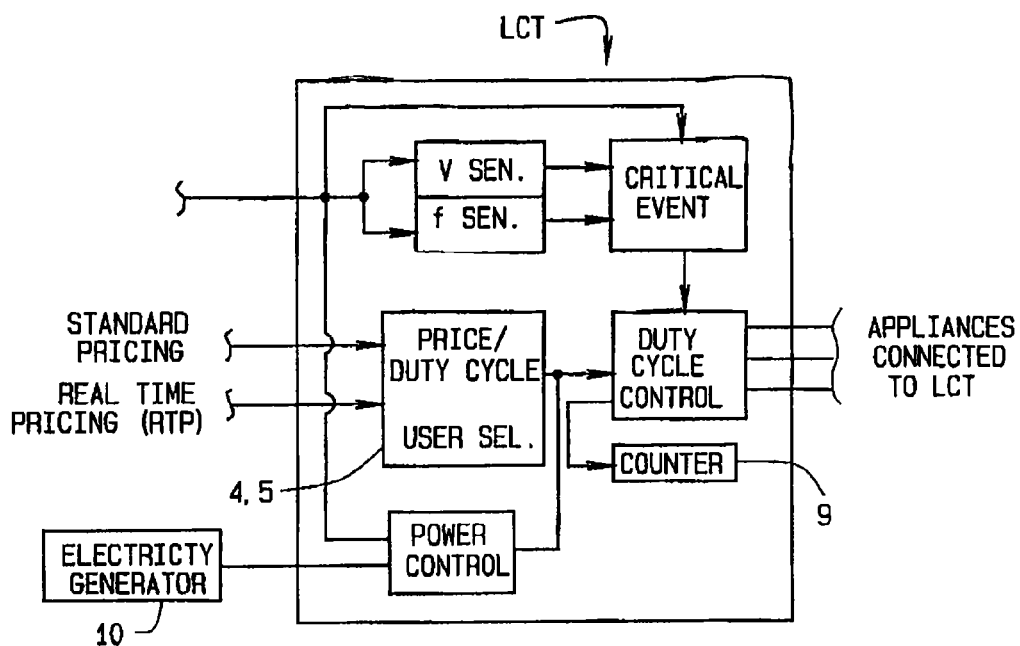
FIG. 3 is a block diagram of a load control transponder (LCT)
Figure 4:
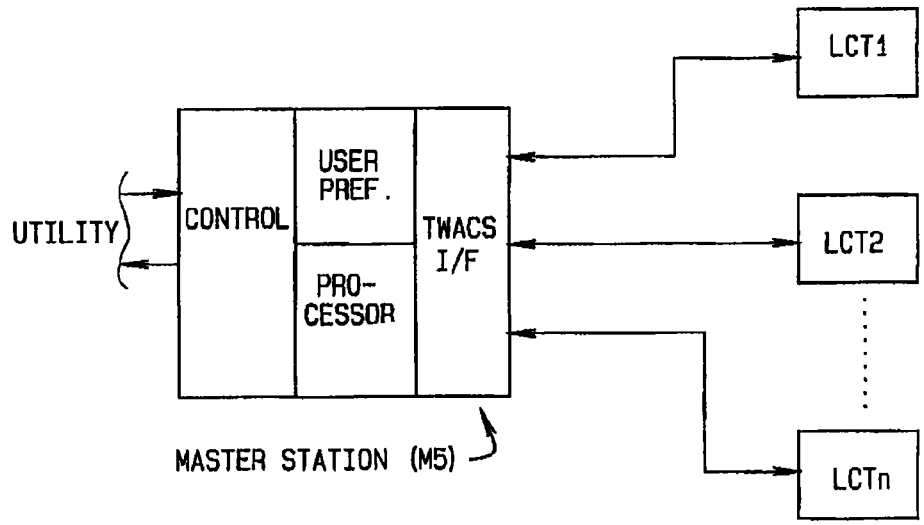
FIG. 4 illustrates a master station (MS) for communications between a utility and LCT's.

Corresponding with a LCT using TWACS®, for example, allows the utility to periodically send the consumer the price of electricity for different levels of load demand on the utility, and enables the consumer to select the duty cycle of each appliance connected to a LCT. As shown in FIG. 2, the LCT has a representative display D. The display includes an indicator for the current operating status of the utility; i.e., normal (G for Green) as well as indicators Y, O, and R (for Yellow, Orange, and Red) which provide the consumer a visual indication of the current load demand on the utility. The display includes an LED display panel 1 indicating which appliance is connected to the LCT; or if more than one appliance can be connected thereto, pushbuttons 2 allow the consumer to scroll between appliances. Another LED display panel 3 indicates the price (cost/KwH) of electricity for the current load demand on the utility. As each price point is reached, the price indication changes accordingly. It will be understood that whenever new price tariffs are established, the utility will inform the consumer and allow them to change their settings based upon the new pricing.

As each price is displayed, the consumer has the ability to adjust the duty cycle of the appliance controlled by the LCT, and as shown on a LED display panel 4, to reduce the duty cycle of the appliance as the price increases, taking into account the consumer' "comfort" level at each price point. Pushbuttons 5 allow the consumer to adjust the duty cycle setting (up or down) for each price point. Once the consumer has adjusted the duty cycle to a preferred setting, they push a button 6 to accept this setting. After the consumer has cycled through all four status indications, and has established appliance duty cycle settings for each, they push a button 7 to permanently set the values and communicate the settings back to the utility. The panel also includes an override button 8 that allows the consumer, under certain conditions, to override the settings and allow the appliance to operate at a 100% duty cycle regardless of the load demand status of the utility. The utility may charge a premium price to the consumer for overriding the utility.

With respect to the duty cycle of an appliance, it will be understood that regardless of the duty cycle setting established by the consumer, the utility will enforce the established price cap in such a way that the appliance, if "on" will still do useful work. With the air conditioning system, for example, this means that if the duty cycle were at the 80% point shown in Table 1, the LCT would not run the air conditioner for the first 48 minutes of each hour and then shut it "off" for the next 12 minutes. Rather, the LCT would stagger the times so that the air conditioner might run for 12 minutes and then be off the next 3 minutes. In this way the heat load buildup the air conditioner has to overcome, to provide effective cooling, is greatly diminished from what it would be using a 48/12 on/off cycle. However, the 80% duty cycle is still maintained.

It will be further understood by those skilled in the art that besides using a display D to configure the LCT, the LCT can also be configured using inputs from a programmable thermostat, using a PC, or the internet, all as shown in FIG. 1.

The LCT incorporates a cost/time program that utilizes the price-comfort levels established by the consumer. When a price point or price threshold is exceeded by some predetermined amount, the LCT operates to enforce the pricing cap established by the consumer. In addition, the LCT monitors the electricity distribution system for critical events of the type previously noted. The LCT is programmed to "self declare" a critical event when one occurs (i.e., an under frequency occurrence). At that time, the LCT applies a predetermined critical event (emergency) price and regulates the appliance accordingly. During a critical event, the U light on display D is illuminated so the consumer has a visual indication of what is happening. Although not shown on display D, the LCT includes internal counters which count both how many times the appliance's duty cycle has been changed, as well as how many times the appliance was "on" when its duty cycle was changed. It will be understood that if the appliance is "on" when a status change occurs, its duty cycle is changed. But, if the appliance were "off", and turned "on", its duty cycle would be whatever is programmed for the then current status of the utility, so that it could come on at less than 100%.

With respect to those critical events that require critical peak pricing by the utility, the utility knows how many times such events occur during a particular period (e.g., a year), their severity and their duration. In addition, the LCT tracks the number of critical events that affected the particular consumer, and how many times, if any, the consumer overrode the utility. Using TWACS, the utility periodically downloads the information stored in the LCT and uses this data for billing purposes, compiling statistical data concerning power usage in the area, and establishing new pricing guidelines.

Finally, the method of the present invention provides a low cost solution for consumers to control the cost of their electricity usage while at the same time allowing the utility the flexibility to address crisis situations should they arise. Since the consumer has a substantial "say" in how they want their appliances or equipment to operate under various load demand conditions to which the utility is subjected, the consumer is given greater assurance that they have some control over their costs.

In view of the above, it will be seen that the several objects and advantages of the present disclosure have been achieved and other advantageous results have been obtained.

The invention claimed is:

1. In an electricity supply system by which electricity is supplied by a utility to consumers, a method of controlling a demand response of consumers comprising:
   informing consumers as to a price of electricity, including increases in the price thereof as demand increases, via price signals transmitted from the utility to the consumer over a communications channel available to the consumer;
   a consumer, using means for interpreting the price signals, assessing a desirability of maintaining a selected load level for an appliance installed at a consumer's location and at what level, if any, the consumer wishes to maintain that load level whenever a price increase occurs or a consumer's individual situation changes;
   programming a control device responsive to an input from the utility that a price increase point has been reached at which the consumer wants to change a level of continuing service from that previously selected by the consumer for that price point, the consumer being capable of overriding an output from the control device based on their individual situation so to operate the appliance at a different load level;
   the utility, if an unplanned, critical event occurs that affects the utility's ability to continue to supply electricity to its consumers, being able to reduce a level of energy consumption by the consumer to a consumer's lowest selected level for continuing service, thereby to shed sufficient load on a system to maintain an adequate level of electricity supply for the system; and,
   whenever an appliance which is "off" at a start of a critical event is turned "on" during the event, a duty cycle of the appliance is whatever is programmed for the then current status of the utility for the duty cycle to immediately be at less than a 100% duty cycle.

2. The method of claim 1 in which the utility, when an unplanned, critical event occurs, goes immediately and directly to a consumer's lowest selected level for continuing service, and bypasses any intermediate consumer established levels of service.

3. The method of claim 2 in which the utility, when the critical event is resolved, restores a consumer's level of usage to their previous level of usage.

4. The method of claim 1 in which there are multiple price points including an initial price point, a maximum price point, and one or more intermediate price points, and the consumer selects a level of continuing service for each price point.

5. The method of claim 4 in which the consumer, for each price point, selects the same level of usage as for the previous price point, sequentially reduces their level of usage each time a higher price point is reached, or discontinues their level of usage altogether.

6. The method of claim 5 in which the consumer reduces their level of usage by selecting to reduce a duty cycle of their appliances and/or equipment to which electricity is supplied by the utility.

7. The method of claim 6 in which the consumer reduces the duty cycle of their appliances and/or equipment each time the price of electricity increases.

8. The method of claim 7 in which the consumer has a flow of electricity to their appliances and/or equipment shut off as the price of electricity reaches a maximum.

9. The method of claim 5 in which the level of usage is controlled by a load control transponder and an extent to which the load control transponder reduces the level of usage each time a price point is reached is selected, in advance, by the consumer.

10. The method of claim 9 further including the utility communicating with the load control transponder using a two way automatic communications system.

11. The method of claim 10 further including the utility communicating with the load control transponder for the load control transponder to bypass all intermediate levels of service selected by the consumer and proceed directly to the consumer's level for service selected for a highest price point for electricity.

12. The method of claim 1 by which, when an unplanned critical event occurs, the control device can self-declare an emergency condition and reduce the level of energy consumption by the consumer to the consumer's lowest selected level for continuing service.

\* \* \* \* \*